(12) United States Patent
Stockhusen

(10) Patent No.: US 7,181,237 B2
(45) Date of Patent: Feb. 20, 2007

(54) CONTROL OF A MULTI-MODE, MULTI-BAND MOBILE TELEPHONE VIA A SINGLE HARDWARE AND SOFTWARE MAN MACHINE INTERFACE

(75) Inventor: Dirk Stockhusen, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 913 days.

(21) Appl. No.: 09/923,633

(22) Filed: Aug. 6, 2001

(65) Prior Publication Data
US 2002/0132636 A1    Sep. 19, 2002

(51) Int. Cl.
    *H04Q 7/00*    (2006.01)
(52) U.S. Cl. .............. 455/552.1; 455/433; 455/435.2; 455/436; 709/230
(58) Field of Classification Search .......... 455/552.1, 455/553, 557, 406, 435.2, 426.1, 412.1, 556.2, 455/433, 436, 73, 90.3; 370/352; 340/5.53; 439/66
See application file for complete search history.

(56) References Cited

U.S. PATENT DOCUMENTS

| 5,923,761 | A | * | 7/1999 | Lodenius | 455/73 |
| 5,943,333 | A | * | 8/1999 | Whinnett et al. | 370/345 |
| 5,946,634 | A | * | 8/1999 | Korpela | 455/552.1 |
| 6,035,212 | A | * | 3/2000 | Rostoker et al. | 455/552.1 |
| 6,138,010 | A |   | 10/2000 | Rabe et al. | |
| 6,173,316 | B1 |   | 1/2001 | De Boor et al. | |
| 6,633,223 | B1 | * | 10/2003 | Schenker et al. | 340/5.53 |
| 6,697,355 | B1 | * | 2/2004 | Lim | 370/352 |
| 6,785,556 | B2 | * | 8/2004 | Souissi | 455/557 |
| 6,865,186 | B1 | * | 3/2005 | Jackson et al. | 370/419 |
| 6,934,558 | B1 | * | 8/2005 | Sainton et al. | 455/552.1 |
| 6,961,583 | B2 | * | 11/2005 | Moles et al. | 455/552.1 |
| 2002/0086702 | A1 | * | 7/2002 | Lai et al. | 455/556 |
| 2003/0181168 | A1 | * | 9/2003 | Herrod et al. | 455/90.3 |
| 2003/0224792 | A1 | * | 12/2003 | Verma et al. | 455/436 |

FOREIGN PATENT DOCUMENTS

| EP | 0 852 448 A1 | 7/1998 |
| WO | WO 00/77940 A1 | 12/2000 |

* cited by examiner

Primary Examiner—Fan Tsang
Assistant Examiner—S A Elahee

(57) ABSTRACT

A system for controlling a multi-mode mobile telephone via a single hardware and software man machine interface (MMI) includes a mode manager for managing switching of the system between two or more modes utilizing different air interface standards supported by different protocol stacks. A user interface communicates information and commands between the protocol stacks and a user. An application layer reduces the functional interface between the protocol stacks to layers of the protocol stacks subsequent to the user interface, allowing control of the mobile telephone to be provided via a single MMI that is substantially consistent across the all modes.

23 Claims, 8 Drawing Sheets

CONTROL OF A MULTI-MODE, MULTI-BAND MOBILE TELEPHONE VIA A SINGLE HARDWARE AND SOFTWARE MAN MACHINE INTERFACE

BACKGROUND OF THE INVENTION

The present invention relates generally to mobile telephones, and more specifically to a system for controlling a multi-mode, multi-band mobile telephone via a single hardware and software man machine interface (MMI).

Mobile telephone air interface standards such as Telecommunications Industry Association/Electronics Industry Alliance Interim Standards 54 and 136 (TIA/EIA54 and TIA/EIA-136), Global System for Mobile communication (GSM), Advanced Mobile Phone Service (AMPS), Telecommunications Industry Association Code Division Multiple Access Interim Standard 95 (CDMA IS-95 or CDMA), GSM/ANSI-41 Interoperability Trial Standard TIA/EIA-41 (GAIT), and the like require support by specific operating systems or protocol stacks, each presenting a functionality specific to the corresponding standard and the technologies applied within those standards. This functionality finds its final representation in the MMI software employed by the telephone, which presents the functionality to the user. Different scopes of functionality typically induce different behavior, and often require the use of different software in the MMI. Where such specific software is used for different standards or modes, specific hardware (e.g. specific hard keys, displays, and the like) may be required. Alternately, redundant MMI software may be provided, increasing the need for added general hardware (e.g. memory, processors, and the like) and increasing complexity to the user. Moreover, since mobile telephones are increasingly providing MMIs providing applications such as organizers, email clients, Internet browsers, and the like, such MMIs can occupy a substantial portion of the telephone's memory compared with other of the telephone's software modules. Thus, in order to provide a multiple mode mobile telephone capable using multiple standards, a substantial portion of the telephone's memory must be dedicated to storage of software providing multiple MMIs. Further, it is normally desirable that only one instance of a particular application be provided by the MMI of the telephone.

Consequently, it is desirable to provide a mobile telephone supporting multiple air interface standards, each capable of supporting multiple bands, through a single MMI, thus abstracting the complexity of the system from the user and enabling the use of a single hardware interface.

SUMMARY OF THE INVENTION

Accordingly, the present invention is directed to a system for controlling a multi-mode mobile telephone via a single hardware and software MMI (MMI). In exemplary embodiments of the invention, the multi-mode mobile telephone is comprised of a hardware system and a software system. The hardware system includes at least one chipset and an interface for controlling the mobile telephone. The software system includes a mode manager for managing switching of the system between two or more modes utilizing different air interface standards supported by different protocol stacks. A user interface communicates information and commands between the protocol stacks and a user. An application layer reduces the functional interface between the protocol stacks to layers of the protocol stacks subsequent to the user interface, allowing control of the mobile telephone to be provided via a single MMI that is substantially consistent across the all modes.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIGS. 1A and 1B are block diagrams illustrating multi-mode mobile telephones in accordance with exemplary embodiments of the present invention, wherein FIG. 1A illustrates a mobile telephone having a dual core and FIG. 1B illustrates a mobile telephone having a single core;

DETAILED DESCRIPTION OF THE INVENTION

Reference will now be made in detail to the presently preferred embodiments of the invention, examples of which are illustrated in the accompanying drawings.

Figure 1A:
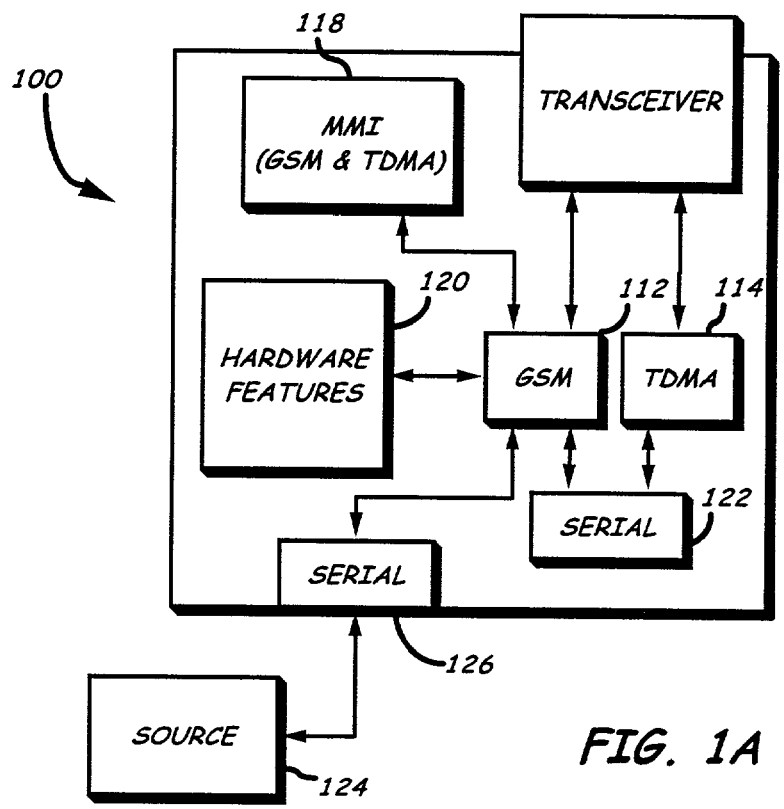
Figure 1B:
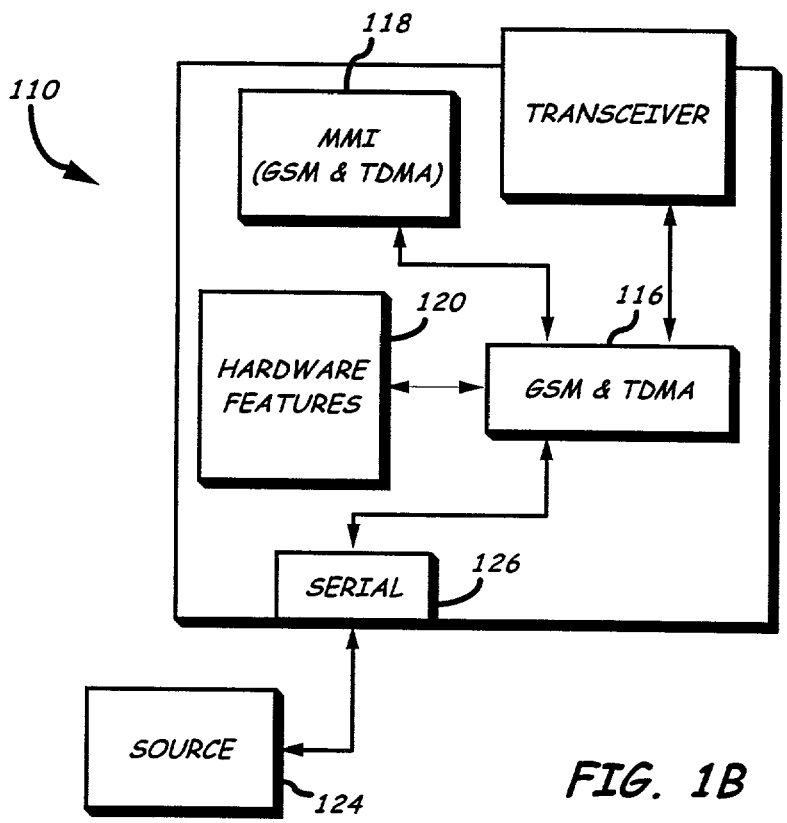

FIGS. 1A and 1B illustrate mobile telephones in accordance with exemplary embodiments of the present invention. Mobile telephones 100 & 110 support dual mode operation wherein each mode employs a different air interface standard. In FIG. 1A, mobile telephone 100 comprises a dual-core mobile telephone capable of supporting the Global System for Mobile communication (GSM) and Telecommunications Industry Association/Electronics Industry Alliance Interim Standard 136 (TIA/EIA-136) (TDMA) air interface standards via mobile station software (MSSW)

protocol stacks running on separate independent hardware systems or chipsets 112 & 114. In FIG. 1B, on the other hand, mobile telephone 110 comprises a single-core mobile telephone having a common chipset 116 capable of supporting both the GSM and TDMA protocol stacks.

Mobile telephones 100 & 110 may switch, or alternately, be switched by the user, between a first mode ("GSM mode") and a second mode ("TDMA mode") for communication with wireless telephone networks employing either GSM or TDMA air interface standards. In the dual-core embodiment shown in FIG. 1A, mobile telephone 100 utilizes GSM protocol supported by the protocol stack running on chipset 112 in the GSM mode. The chipset 114 on which the protocol stack supporting the TDMA air interface standard may be shut down completely since that protocol stack is not utilized. In the TDMA mode, mobile telephone 100 utilizes TDMA protocol supported by the protocol stack running on chipset 114. The processor of chipset 112 continues to control the MMI 118 of mobile telephone 100 and any additional hardware related features 120 such as battery measurement and charging, microphone volume, loudspeaker volume, control of address books memory, or the like. Thus, there is only one instance of the MMI and database.

As shown in FIG. 1A, chipsets 112 & 114 communicate with one another via a serial connection 122. In exemplary embodiments of the invention, one or more processes running within the mobile station software (MSSW) systems running on each chipset 112 & 114 provide for transfer of man machine interface (MMI) related information. These processes establish a communication channel between the GSM and TDMA protocol stacks allowing communication there between for the display of TDMA call specific user data by the display driver of the processor of chipset 112, and for sending user requests from the processor of chipset 112 to the TDMA protocol stack of chipset 114. Chipset 112 may further communicate data with an external source 124 via serial connection 126. For instance, external source 124 may communicate software providing enhanced functionality (e.g. organizers, browsers, user interfaces, etc.), address book information, messages, email or the like.

In the single-core embodiment shown in FIG. 1B, both the GSM protocol stack TDMA protocol stacks run on chipset 116. Thus, serial connection 122 (FIG. 1A is not required. The processor of chipset 116 controls the MMI 118 and additional hardware related features 120 of the mobile telephone 110 and provides communication of data with external source 124 via serial connection 126. However, there may be only one instance of the serial communication software or driver for serial connections 122 & 126.

It will be appreciated that protocol stacks may be provided for mobile telephones 100 & 110 that support air interface standards other than GSM and TDMA. Such air interface standards include Advanced Mobile Phone Service (AMPS), Narrow Band AMPS (NAMPS), Digital AMPS (D-AMPS), Digital European Cordless Telephone System (DECT), Telecommunications Industry Association Code Division Multiple Access Interim Standard 95 (CDMA IS-95 or CDMA), and the like. Further, while implementation of the present invention in a dual-mode mobile telephone 100 is discussed herein in the description of FIG. 1A, it is contemplated that the present invention may also be utilized by multiple-mode telephones supporting three or more air interface standards without departing from the scope and spirit of the present invention. Additionally, there may be different grades of integration between technologies employed (e.g., an integrated baseband chipset and two cores, or the like).

Figure 2A:
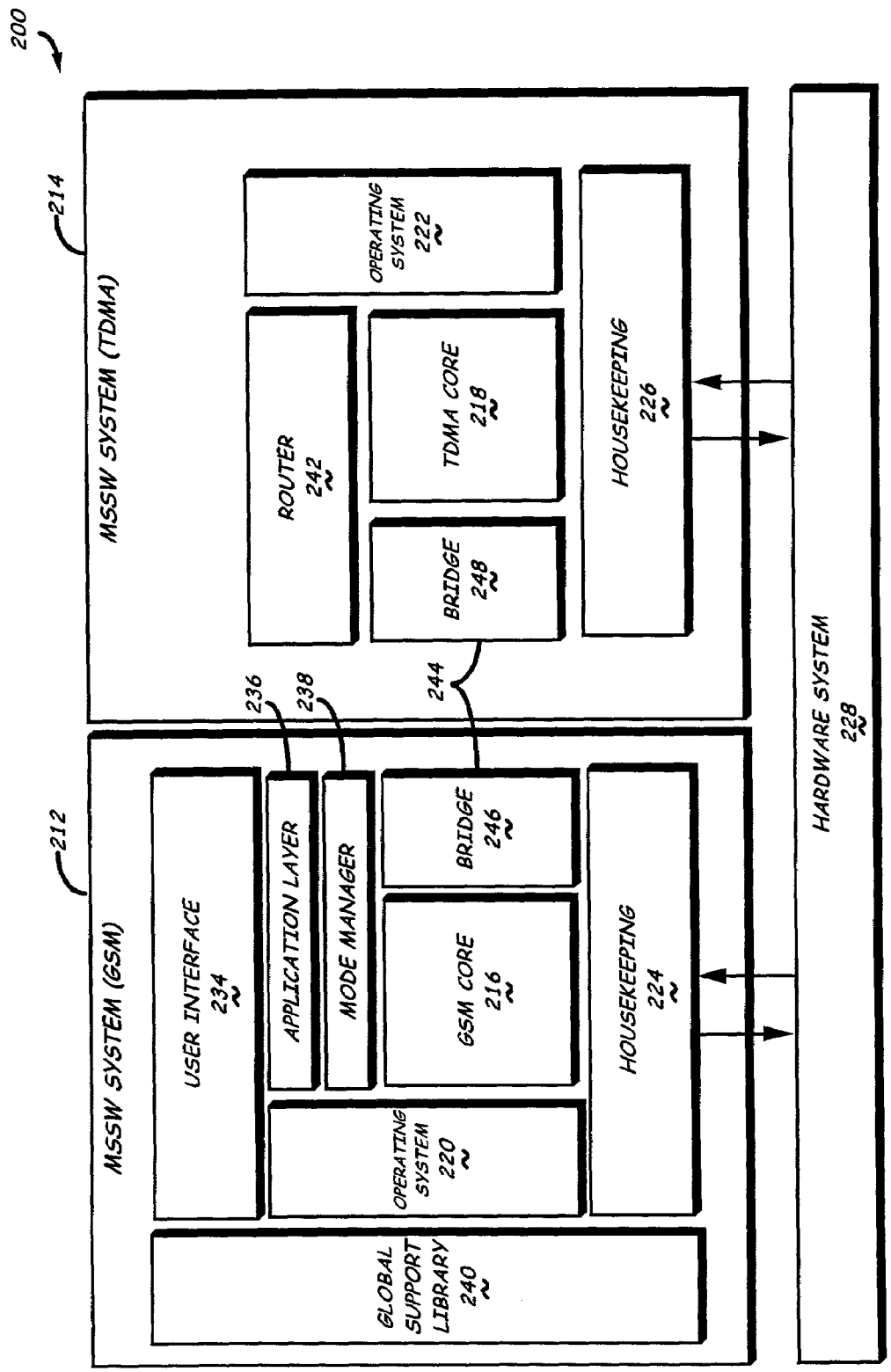
FIGS. 2A and 2B are block illustrating exemplary system architectures for controlling multi-mode mobile telephones, such as the dual and single core mobile telephones shown in FIGS. 1A and 1B, via a single hardware and software MMI.
Figure 2B:
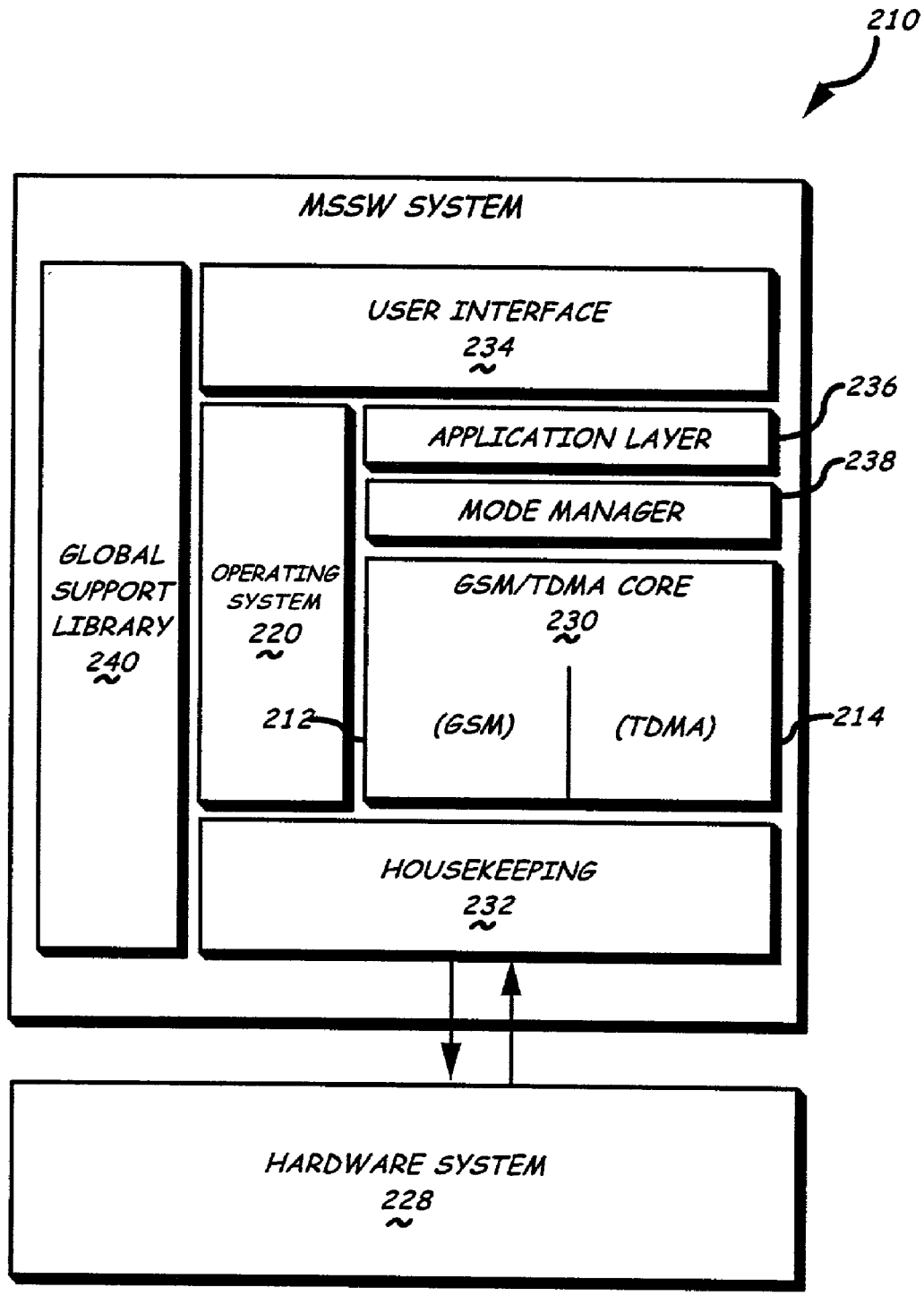

Referring now to FIGS. 2A and 2B, exemplary software architectures for mobile telephones 100 & 110 shown in FIGS. 1A & 1B are described. Architecture 200, shown in FIG. 2A is multiple-core (i.e., dual-core) while architecture 210, shown in FIG. 2B is single core. Both architectures are comprised of two or more MSSW protocol stacks supporting different air interface standards. For instance, in the embodiments shown, architectures 200 & 210 include a first software system protocol stack ("MSSW SYSTEM (GSM)") 212 supporting the GSM air interface standard and a second software system protocol stack ("MSSW SYSTEM (TDMA)") 214 supporting the TDMA air interface standard.

In architecture 200 (FIG. 2A), each MSSW protocol stack 212 & 214 is supported by a core processing system (e.g., "GSM CORE" 216 and "TDMA CORE" 218) and utilizes an operating system 220 & 222 appropriate to the processor of the chipset employed (e.g., operating system 220 may be a GSM Betriebs System (GBS) and operating system 222 may be a Nudeus+system). In exemplary embodiments, GSM core 216 may include GSM Layers 1/2/3, a Subscriber Identity Module (SIM), or, alternately, User Identity Module (UIM) card, a data services module for supporting data services provided by the GSM air interface, and the like. TDMA core 218 may likewise include a suitable hardware abstraction layer and associated control software for the baseband processor employed. For instance, in one embodiment, TDMA core 218 may employ a PC3610 baseband processor manufactured by PrairieCom, Inc. employing Wireless Hardware Abstraction Layer (WHAL) software and suitable control software. Each protocol stack 212 & 214 further includes suitable "housekeeping" software modules 224 & 226 for providing system input/output (I/O), service, and identification and security for interfacing the MSSW protocol stacks 212 & 214 with components of the mobile telephone's hardware system 228.

In architecture 210 (FIG. 2B), both MSSW protocol stacks 212 & 214 are supported by a common core processing system (e.g., "GSM/TDMA CORE" 230) using a suitable operating system 220. GSM/TDMA core 230 may include GSM Layers 1/2/3, a Subscriber Identity Module (SIM), or, alternately, User Identity Module (UIM) card, a data services module for supporting data services provided by the GSM air interface, and the like, and a suitable TDMA hardware abstraction layer and associated control software. Because protocol stacks 212 & 214 are supported by a common core 230, only one housekeeping software module 232 is utilized for interfacing the MSSW protocol stacks 212 & 214 with components of the mobile telephone's hardware system 228.

In accordance with the present invention, GSM MSSW protocol stack 212 includes a user interface 234 for providing the software MMI for mobile telephone 100 (FIG. 1). User interface 234 communicates information and commands between the first and second protocol stacks and a user via a hardware user interface. For instance, user interface 234 may control display of command options by the display of the mobile telephone, display of messages (e.g., Short Message Service (SMS) messages), ring volume control, ring type control, acceptance of command from the telephone keypad, and the like. In embodiments of the invention, user interface 234 may include applications such as organizers, electronic mail (email) clients, network (e.g., Internet) browsers, and the like. User interface 234 may further provide for remote control of the mobile telephone, for example, by the wireless communication network with which the telephone is communicating.

Application layer 236 reduces the functional interface between the first and second protocol stacks 212 & 214 to layers of the first and second protocol stacks subsequent to the user interface (i.e., below user interface 234). In this manner, the differences in technologies employed by the different air interface standards are made substantially transparent to the user of the mobile telephone. Further, by abstracting the functionality of the different air interface standards to other levels of the respective protocol stacks 212 & 214, applications (e.g., organizers, email clients, network browsers, and the like) may be more easily added to, removed from, or modified within the user interface 234 without modification of the different protocol stacks 212 & 214 so that the applications may support each air interface standard without special modification. This greatly reduces the complexity of the MMI, making the mobile telephone easier to use than would be a telephone employing different MMIs for each mode, or a telephone employing a MMI that is modified with redundant software for supporting both air interface standards. In this manner, the present invention allows control of the mobile telephone to be provided via a single hardware and software MMI that is substantially consistent across all modes (e.g., across GSM and TDMA modes).

Mode manager 238 manages switching of mobile telephone operation between air interfaces supported by MSSW protocol stacks 212 & 214. For example, in the embodiment shown, mode manager 238 controls switching between a first mode utilizing the GSM air interface standard supported by first protocol stack 212 ("GSM mode") and a second mode utilizing the TDMA air interface standard supported by a second protocol stack 214 ("TDMA mode"). Mode manager 238 may further include a routing mechanism ("Router") for routing of information and messages to the selected protocol stack 212 or 214, and a translator ("MMI Manager") for translation of information between the different air interface standards, optionally, including mapping of differences in format of the parameters used by the different technologies and making adaptations for different handling of those parameters. Translation of information between the different air interface standards may alternately be provided by application layer 236.

In FIGS. 2A and 2B, mode manager 238 is shown as being integrated in GSM MSSW protocol stack 212. However, it is contemplated that mode manager 238, which is preferably a single entity, may alternately be implemented as part of TDMA MSSW protocol stack 214. Further, it will be appreciated that in mobile telephones employing multiple core architectures, mode manager 238 may be in implemented in any of the various protocol stacks supporting a given standard.

The software system or protocol stack 212 supporting mode manager 238 may control a database providing storage of all user relevant data for use by both software systems. Such user relevant data may include, but is not limited to, address book and phone book entries, short messages (e.g., an SMS message, or the like), emails, ringing tones, and pictures. Additionally, a second database may be provided for storing call-related data. In exemplary embodiments, this second database may be implemented as an entity with mode manager 238. However, such a second database may be implemented as multiple entities in each MSSW protocol stack 212 & 214, depending on the requirements of the software system design. The software system or protocol stack 212 supporting mode manager 238 further include a library ("GLOBAL SUPPORT LIBRARY") 240 contains software modules (e.g., math.c or the like) utilized in different software entities of architectures 200 & 210.

As shown in FIG. 2A, TDMA MSSW protocol stack 214 may include a router 242 for routing information and messages within the TDMA protocol stack 214 and for routing messages from the TDMA protocol stack 214 to the GSM MSSW protocol stack 212. This router 242 is not needed in single core architecture 210 (FIG. 2B).

In dual core architecture 200 (FIG. 2A), a bridge 244 may be provided for enabling routing of information and messages between GSM MSSW protocol stack 212 and TDMA MSSW protocol stack 214 via serial connection 122 since protocol stacks 212 & 214 are running on different hardware systems, i.e., different chipsets 112 & 114 as shown in FIG. 1A. Bridge 244 may include one or more processes 246 & 248 running within each MSSW protocol stack 212 & 214 which provide for transfer of MMI related information and GSM Layer 1 commands. Processes 246 & 248 establish a communication channel between the GSM and TDMA protocol stacks 212 & 214 allowing communication there between for the display of TDMA call specific user information, and for sending user requests from the GSM protocol stack 212 to the TDMA protocol stack 214. Wherein the MSSW protocol stacks 212 & 214 are integrated into a single hardware system, as in single core architecture 210 shown in FIG. 2B, bridge 244 is not required since messages may be routed directly to the appropriate protocol stack 212 or 214.

Figure 3A:
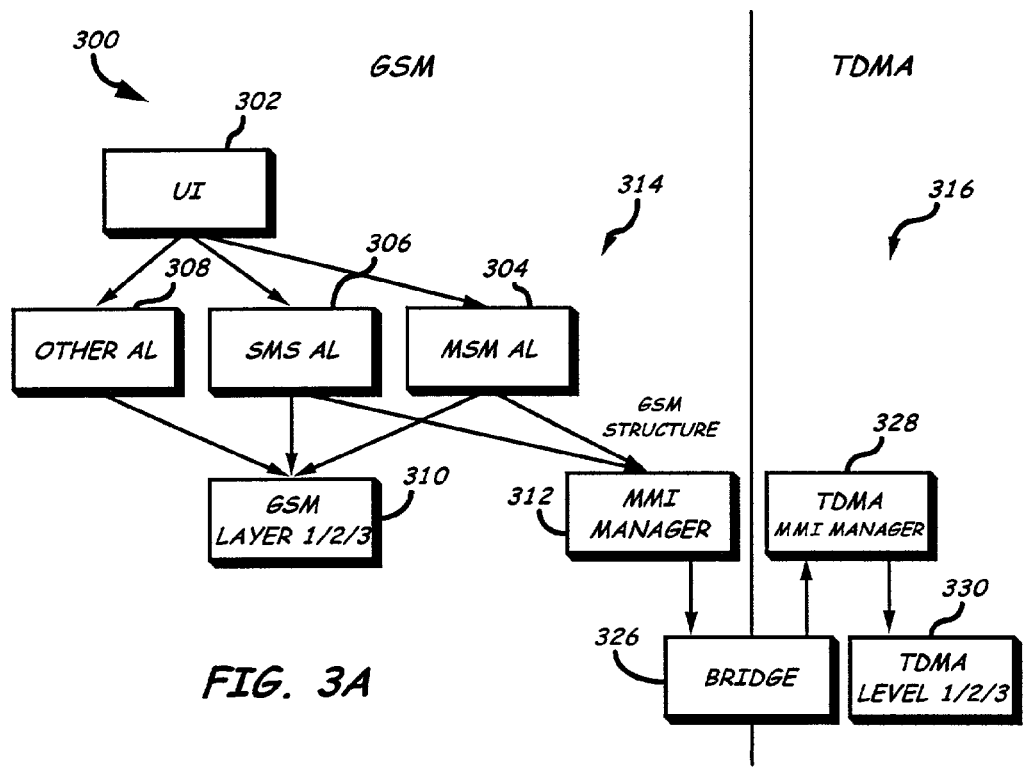
FIGS. 3A, 3B and 3C are block diagrams further illustrating the interface of software modules of the system architecture shown in FIG. 2A in accordance with exemplary embodiments of the present invention.
Figure 3B:
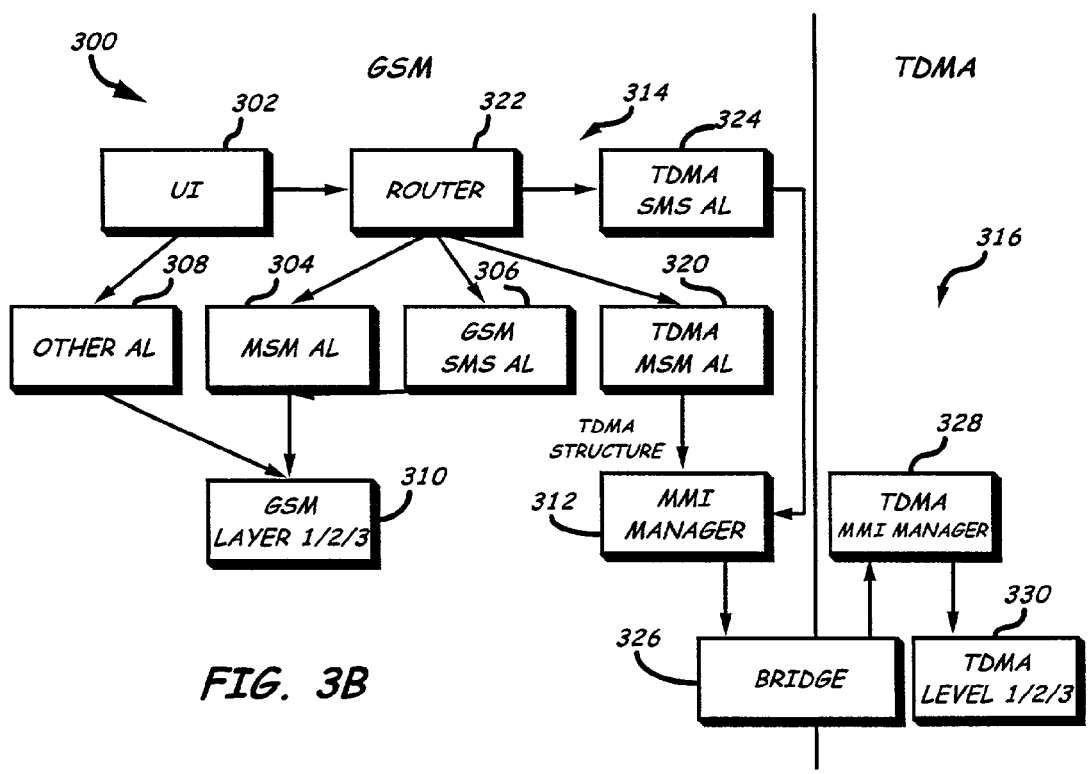
Figure 3C:
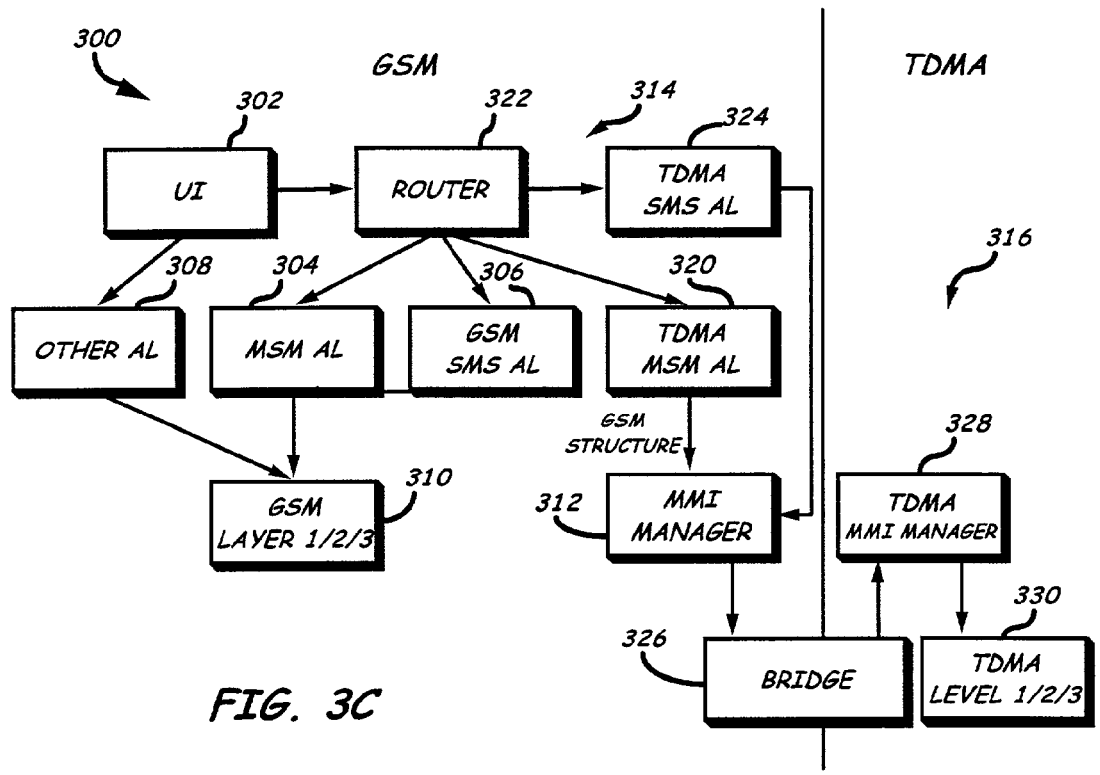

Referring now to FIGS. 3A, 3B and 3C, interfaces between the mode manager 238 (FIG. 2A) to and from higher level modules of application layer 236 and user interface 234, and the lower level bridge 244 for a dual mode mobile telephone are described. In the architecture 300 shown, the flow of messages for call-related functionality involves user interface (UI) 302, application layers including MSM application layer 304, GSM SMS application layer 306, other application layers 308, and the GSM layers 1/2/3 310. Architecture 300 facilitates reading and writing of call-related data to the CNI (Call Number Information) area of the GSM core 216 (FIG. 2A), and sending of messages with associated structures between the various layers (e.g., the user interface 302 to application layers 304, 306, & 308 and application layers 304, 306 & 308 to GSM layer 1/2/3 310). For TDMA air interface specification related functions, MMI manager 312, which is functionally part of mode manager 238 (FIG. 2A), provides some functionality previously furnished by the GSM Layer 1/2/3 in GSM single mode telephones relating to reading and writing data to the CNI as well as passing structures to and from the application layers. In exemplary embodiments of the invention, MMI manager 312 performs functional actions based on the message it is processing. Such actions include reading data from or writing data to the CNI and a corresponding TDMA structure, followed by sending of the appropriate message to an application layer or the bridge.

In the embodiment of architecture 300 shown in FIG. 3A, common MSM and SMS application layers 304 & 306 are employed for both GSM and TDMA modes instead of using separate TDMA MSM and SMS application layers, as in the embodiments illustrated in FIGS. 3A and 3B. MMI Manager 312 writes data to the CNI, and passes the current GSM structures to MSM and SMS application layers 304 & 306 when calling the existing message passing functions implemented in MSM application layer. The data written by the MSM application layer to the CNI, and the structures that are passed with those messages are not modified.

Alternately, in the embodiments of architecture 300 shown in FIGS. 3B and 3C, reverse MSM messages from the user interface 302 (i.e., messages from GSM protocol stack 314 to TDMA protocol stack 316) may be directed to either the GSM MSM application layer 304 or a TDMA MSM application layer 320 through a routing mechanism 322. Similarly, reverse SMS (Short Message Service) messages from MMI 302 are directed to either the GSM SMS application layer 304 or a TDMA SMS application layer 324 via routing mechanism 322. Forward MSM messages from the MMI manager 312 (i.e., messages from TDMA protocol stack 316 to GSM protocol stack 314) are sent to TDMA MSM application layer 320, which communicates the messages to the user interface 302. Forward messages from the GSM MSM application layer 306 are communicated directly to the MMI 302.

As shown in FIG. 3B, TDMA MSM application layer 320 and TDMA SMS application layer 324 may further provide conversion of data between GSM and TDMA formats required by the respective GSM and TDMA system software. For instance, wherein forward messages are passed from TDMA protocol stack 316 to GSM protocol stack 314, MMI manager 312 may call a function in TDMA MSM application layer 320 and pass the TDMA data structure it receives from bridge 326, which in one embodiment may be a serial interface bridge between TDMA and GSM. The TDMA MSM application layer 320 then fills in fields in the CNI based on data in this structure, and performs MSM functionality. When reverse messages are passed from GSM protocol stack 314 to TDMA protocol stack 316, TDMA MSM application layer 320 converts data from the CNI to assemble a TDMA structure. This structure is then passed through a function interface to MMI manger 312. MMI manager 312 then sends the appropriate message corresponding to the structure to bridge 326, which communicates the message to TDMA MMI manager 328 (i.e., router 242 (FIG. 2A)). TDMA MMI manager 328 then provides the message to TDMA level 2/3 330. Because mapping between TDMA and GSM data is handled within TDMA MSM and SMS application layers 320 & 324, call and message control functionality related to the TDMA air interface may be isolated in these TDMA application layers 320 & 324. In this manner, MMI manager 312 may be isolated in the sense that it will only contain functionality related to interfacing to and from bridge 326. Thus, a modification to a feature of the MMI 302 and application layers 308, 304, 306, 320 & 324 affecting call control or messaging will require little or no modification to the MMI manager 312. Any significant modifications thus take place in the MSM and SMS application layers 304, 306, 320 & 324 instead of both the MSM or SMS application layers 304, 306, 320 & 324 and the MMI manager 312. Thus, modification to the MMI manager 312 may be made necessary only when TDMA messages defined between the GSM and TDMA protocol stacks 314 & 316 are changed.

Alternately, as shown in FIG. 3C, conversion of data between GSM and TDMA formats required by respective GSM and TDMA system software may be performed by MMI manager 312. In this embodiment, MMI manager writes GSM relevant data to the CNI and passes GSM structures to the MSM and SMS application layers 320 & 324. Thus, messages written by the TDMA MSM and SMS application layers 320 & 324 to the CNI, and the structures that are passed with those messages are not modified. However, the complexity of MMI Manager 312 is increased because the MMI manager 312, and not the TDMA MSM and SMS application layers 320 & 324, provides mapping of the data needed for call control and messaging features.

Figure 4:
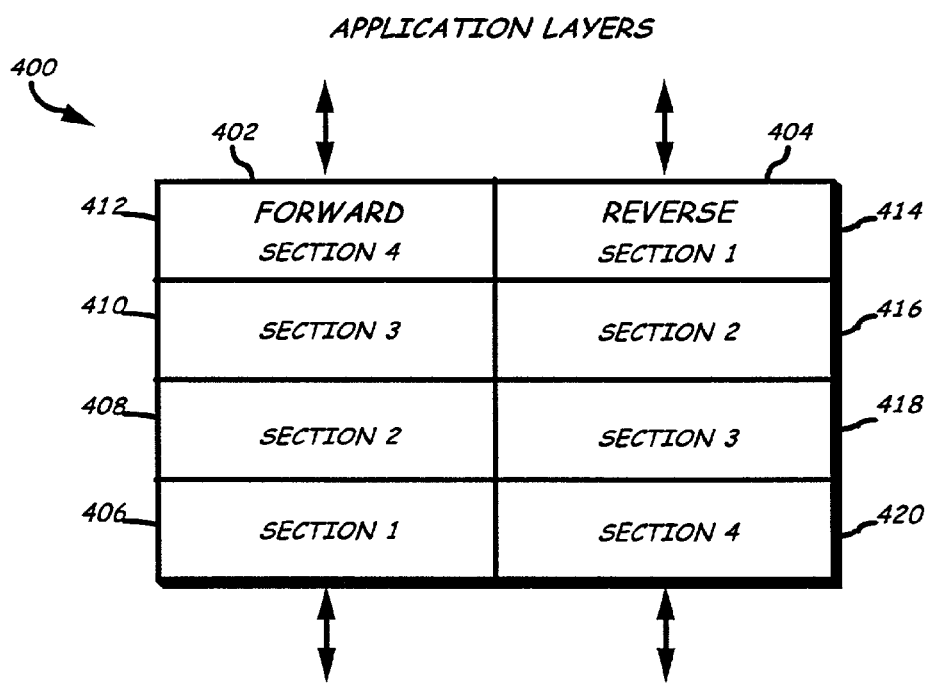
FIG. 4 is a block diagram illustrating an exemplary MMI manager suitable for use within the system architectures shown in FIGS. 3A, 3B and 3C.

Turning now to FIG. 4, an exemplary MMI Manager is described. MMI manager 400 may be logically divided into two components 402 & 404: a first component 402 dealing with forward messages (i.e., messages from the GSM protocol stack to the TDMA protocol stack), and a second component 404 dealing with reverse messages (i.e., messages from the TDMA protocol stack to the GSM protocol stack). Each component 402 & 404 may have an interface to and/or from one or more application layers and the bridge, as well as facilities for translating information between GSM and TDMA formats.

The forward component of MMI manager 400 may further be divided into four sections 406–412. The first section 406 provides a function interface serving as the link to the serial bridge. The first section 406 is called by the bridge to pass messages to MMI manager 400, passing the TDMA structure corresponding to such messages. The second section 408 processes forward messages based on the TDMA message structure passed to the function interface of first section 406. The second section 408 may be implemented as a function that, in turn, calls a second function corresponding to the TDMA message passed. The third section 410 provides implementation of the functions called by first and second sections 406 & 408 for handling the forward messages. Preferably, a unique function for each forward message may be implemented that will write data to the CNI and assemble any relevant GSM structure based on data in the TDMA structure passed to it. The fourth section 412 interfaces with the application layers. In exemplary embodiments, the fourth section 412 calls functions in application layers appropriate for the GSM message passed.

The reverse component 404 of MMI manager 400 may similarly be divided into four sections 414–420. The first section 414 provides a function interface with upper application layers sending messages to the MMI manger 400. In exemplary embodiments, first section 414 is implemented as a single function in MMI manager 400, which takes a structure including the type of GSM message and the relevant data. The second section 416 processes reverse messages based on the GSM message structure passed to the function interface of first section 414. Second section 416 may be implemented as a function that calls a second function corresponding to the GSM message passed. The third section 418 provides implementation of the functions called first and second sections 414 & 416 for handling reverse messages. Preferably, a unique function for each reverse message is implemented for assembling the appropriate TDMA structure based on data in the CNI and the GSM structure passed to the MMI manager. The fourth section 420 interfaces with the bridge serial link to the TDMA protocol stack, passing the TDMA structure assembled by the first, second and third sections 414, 416 & 418.

Figure 5:
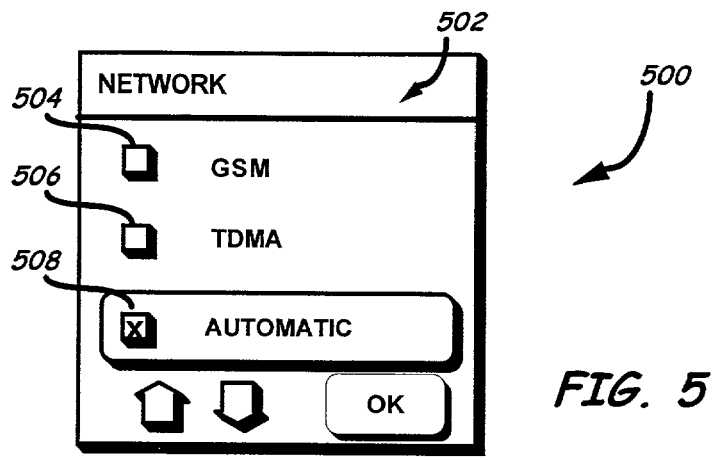
FIG. 5 is a schematic diagram illustrating a menu screen of a user interface in accordance with the present invention, wherein the menu screen is suitable for allowing a user to select between network modes supported by the mobile telephone.

As discussed in the description of FIG. 2, the network or technology selector of mode manager 238 provides the necessary features functionality for basic multimode operation (e.g., dual mode GSM/TDMA operation) with "automatic" selection capability between modes based on user-selection. Preferably, the MMI of the mobile telephone is capable of allowing the user to change the preferred technology or network mode for selecting between air interfaces. For instance, as shown in FIG. 5, the user interface of the mobile telephone may provide a menu screen 500 having options 502 that allow a user to select the technology or network mode used by the telephone. In the dual mode system of the embodiment shown, the user may be allowed to select GSM mode ("GSM") 504, TDMA mode ("TDMA") 506, or to allow the system to automatically select a mode based on predetermined criteria ("AUTOMATIC") 508 and network status. Automatic selection between modes is illustrated as being selected in FIG. 5.

Figure 6:
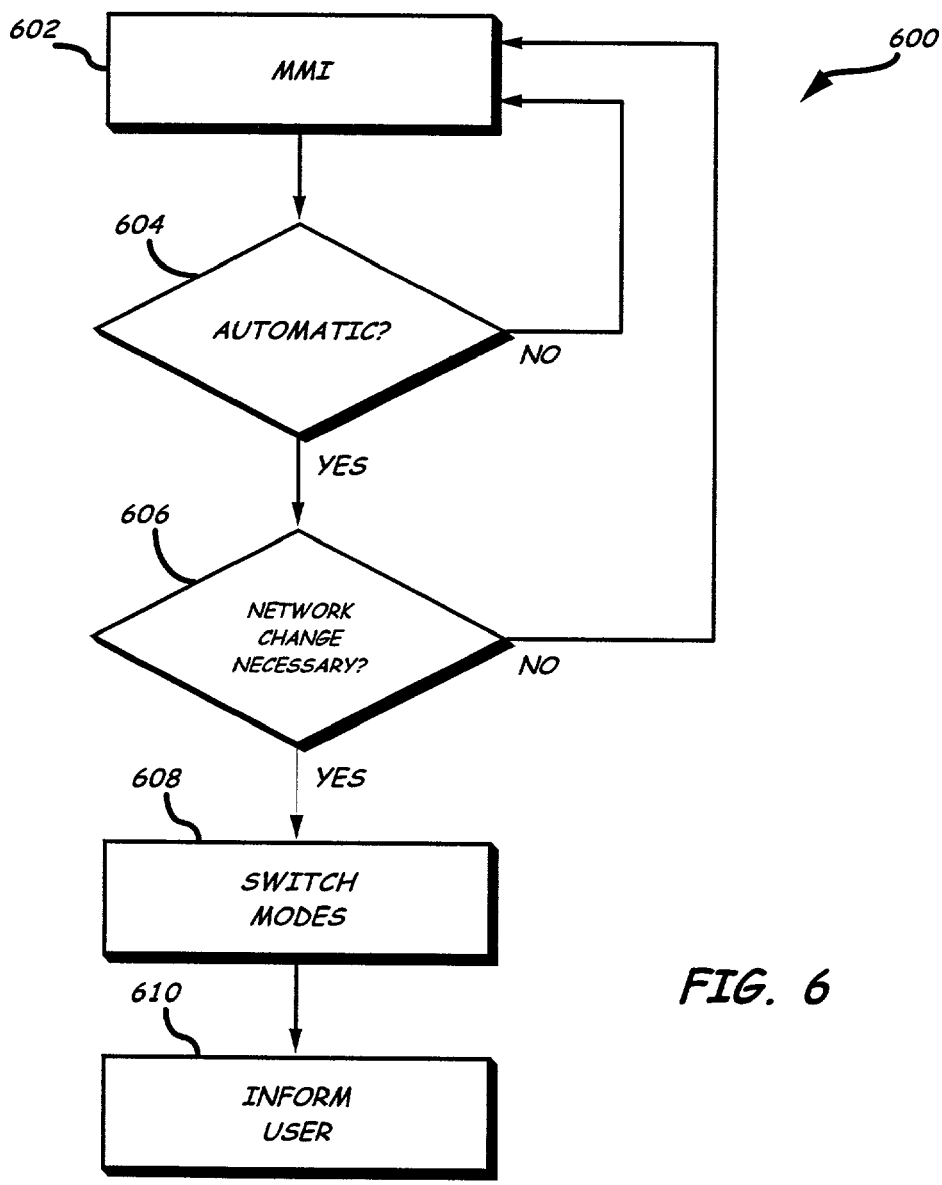
FIG. 6 is a flow diagram illustrating a for switching between network modes supported by the mobile telephone.

Referring now to FIG. 6, an exemplary method suitable for use by the network selector module of mode manager 238 (FIGS. 2A and 2B) for switching between modes or networks using different air interface standards is described. The method 600 is initiated at step 602 when a user selects a technology mode via the MMI of the mobile telephone. Wherein GSM and TDMA modes are supported by the telephone software architecture, the user may select between GSM mode only, TDMA mode only, or to allow the system to automatically select either GSM or TDMA mode based on network availability or using predetermined selection criteria. In exemplary embodiments, if either GSM mode or TDMA mode is selected, then that mode is used exclusively. The man machine interface (MMI) is monitored for a change in selection. For example, if GSM mode is initially selected, the MMI is monitored for access by the user (e.g., to a technology selection menu) and selection of either TDMA mode, or automatic mode switching. If service using the selected mode is determined to be unavailable, a message may be provided to the user informing the user of the absence of service using the selected mode. If automatic selection of modes is selected at step 604, a determination is made at step 606 whether switching from the selected mode to the non-selected mode is necessary. For instance, the system may periodically receive indications as to the availability of service from the protocol stack corresponding to the mode selected. If an indication that service is no longer available using the selected mode is received, or that service is now available using the non-selected mode and that mode is preferred over the currently selected mode, switching is initiated between modes at step 608. A timer may be provided for triggering periodic checking for the availability of the non-selected technology. For example, if GSM mode is selected and a user enters an area where GSM service is unavailable, the telephone may automatically switch to TDMA mode, to provide uninterrupted service. Similarly, if TDMA mode is being used by the mobile telephone because the preferred mode (GSM) is unavailable, an indication that GSM mode has become available may cause the mobile telephone to switch to GSM mode.

In exemplary embodiments of the invention, the system may provide for emergency calls on both GSM and TDMA modes. Thus, if an emergency call is originated, the system may check the current technology mode and available service. If there is any service (either full or limited service) in the selected mode (GSM or TDMA), the system may make the emergency call. If there is no service found in the selected mode or technology, the system may switch to the currently non-selected mode, and attempt to obtain service. If automatic selection between modes is selected, the system may buffer the call number and search for available service. Again, if no service is found in one mode, the system may switch modes to find service.

Figure 7:
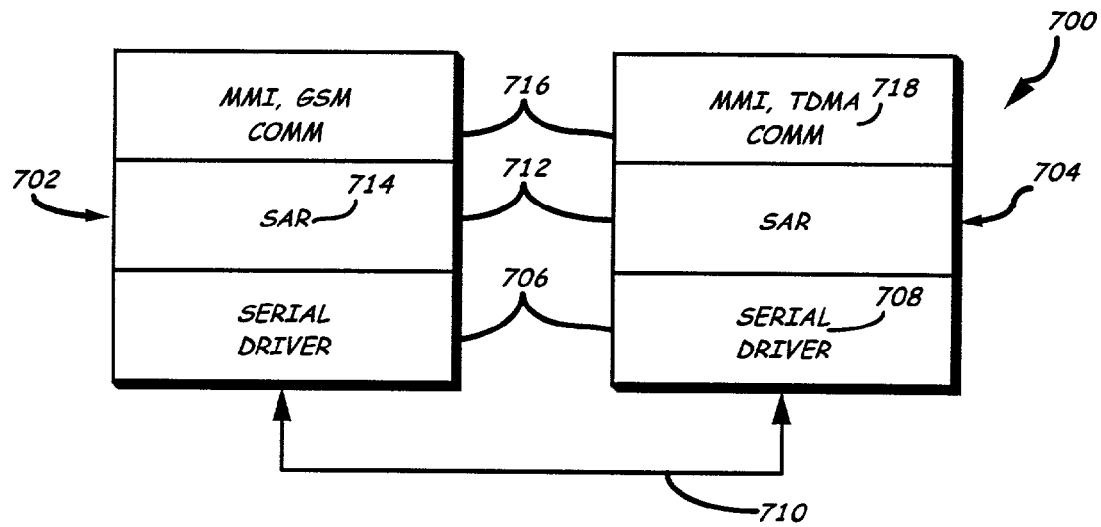
FIG. 7 is a block diagram illustrating an exemplary structure of a serial bridge suitable for communicating data between hardware systems of the mobile telephone.
Figure 8:
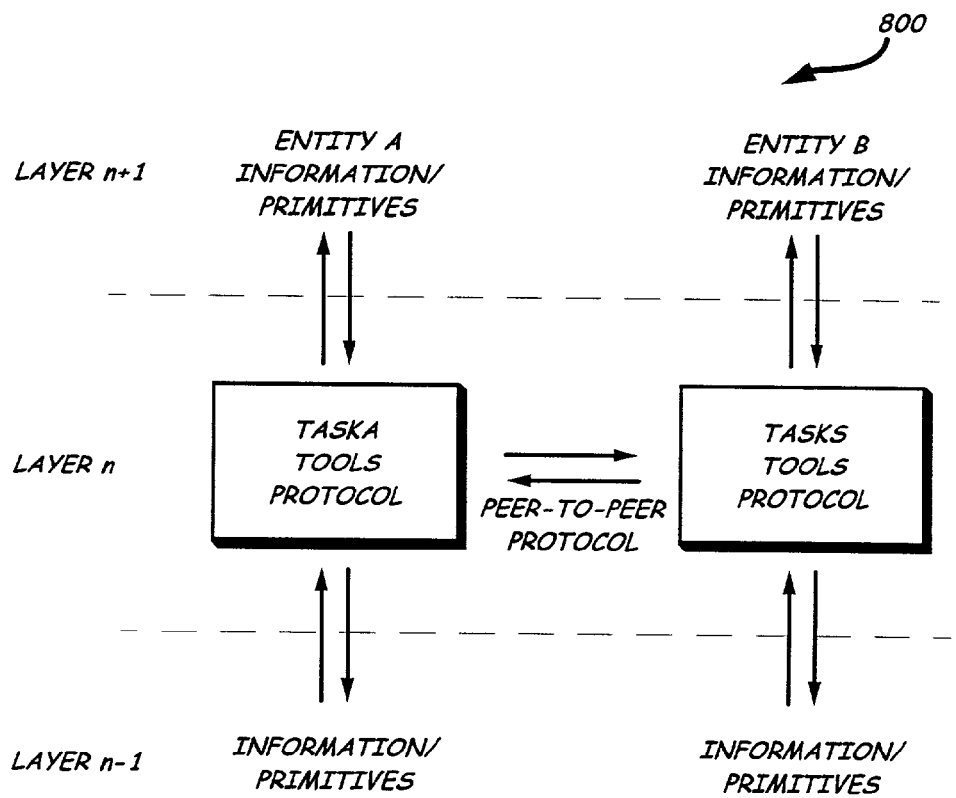
FIG. 8 is a block diagram illustrating layered functionality provided by the Open Systems Interconnect (OSI) model employed in the serial bridge structure shown in FIG. 7.

Referring now to FIGS. 7 and 8, an exemplary bridge for providing interprocessor communication (IPC) between processors of chipsets in a multi-mode mobile telephone is described. Bridge 700, which may have a structure that is characteristic of the bridge 244 utilized by dual core architecture 200 shown in FIG. 2A, may utilize an OSI (Open Systems Interconnect) model 800 generally illustrated in FIG. 8. Using this model, each of the GSM and TDMA components 702 & 704 or processes of bridge 700 is comprised of a first or physical layer ("Layer 1") 706. In exemplary embodiments, physical layer 706 includes serial driver 708 for performing reception and transmission of serial data over serial connection 710 using BFB protocol. A second layer ("Layer 2") 712 disposed over the physical layer 706 includes a segmentation and re-assembly mechanism (SAR) 714 for providing reliable transmission and distribution of data. A third layer ("Layer 3") 716, disposed on top of the second layer 712, supports application modules providing internal communication within bridge 700. Such application modules include the MMI Manager (see FIG. 4) and applications modules for communicating with the GSM processor or TDMA processor (e.g, GSM processor communicator, and the like). Such applications may use the services of bridge 700 for exchange of data between protocol stacks running on GSM and TDMA chipsets within the mobile telephone. The third layer 716 may further provide applications for external communication. Such applications may include a PCAT (Phone Calibration, Adjust and Test) application, a data logger application, fax and data channel applications, and the like.

Figure 9:
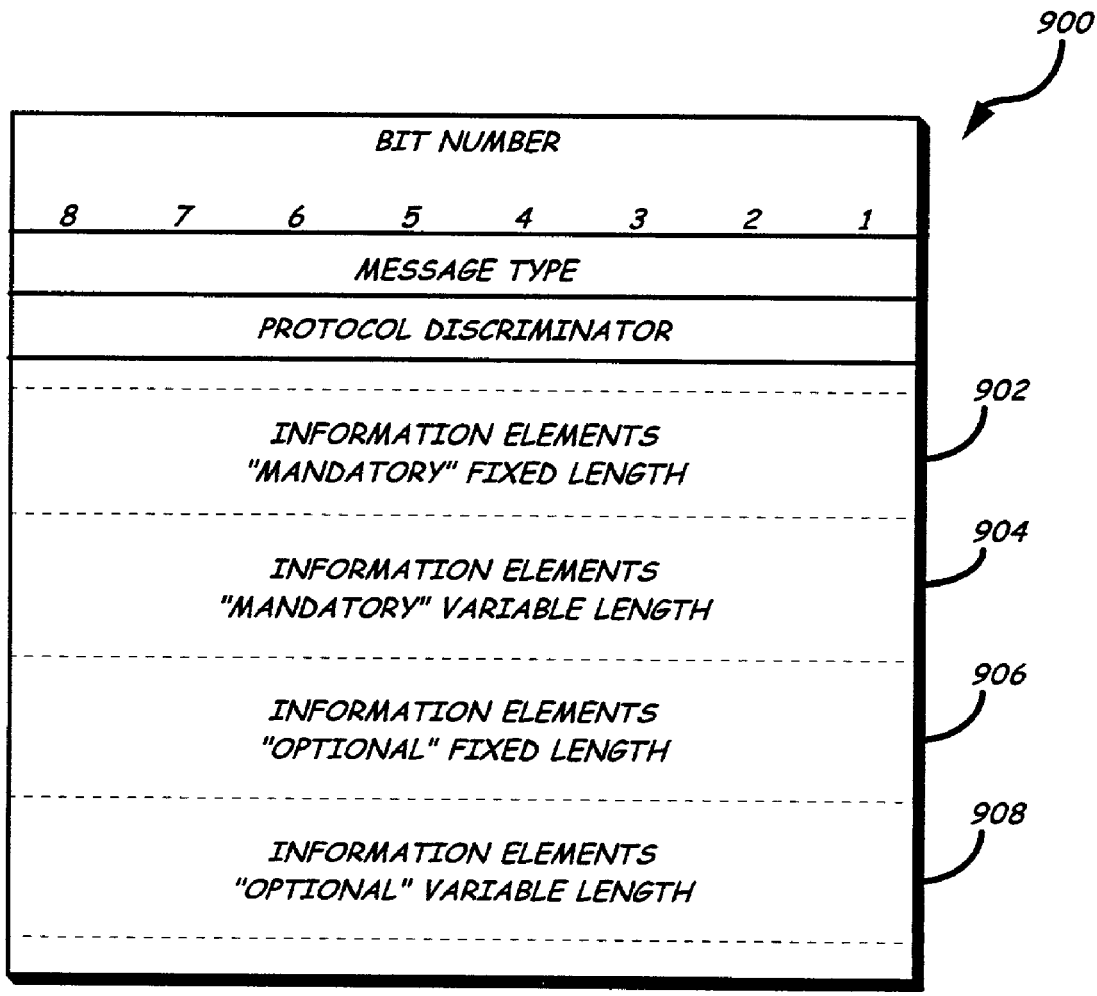
FIG. 9 is a schematic diagram illustrating an exemplary inter-processor communication (IPC) message format in accordance with an exemplary embodiment of the present invention.

FIG. 9 illustrates the structure used for MMI specific messages employed by the third layer ("Layer 3") 716 shown in FIG. 7. As shown, an MMI specific message 900 may include elements of different types. For example, an MMI message 900 may include mandatory fixed length elements 902, mandatory variable length elements 904, optional fixed length elements 906 and optional variable length elements 908. In exemplary embodiments, mandatory fixed length elements 902 and mandatory variable length elements 904 are used primarily for IPC communications. Inter processor control man machine interface (IPC MMI) messages may further comprise call processing forward messages (TDMA-GSM), call processing reverse messages (GSM-TDMA), database access forward messages, database access reverse messages, built-in monitor messages, response messages, and the like.

It is believed that the of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile telephone system, comprising:
   a mode manager for managing switching of the system between a first mode utilizing a first air interface standard supported by a first protocol stack and a second mode utilizing a second air interface standard supported by a second protocol stack, the first protocol stack and the second protocol stack being supported concurrently by at least one chipset of the mobile telephone, the mode manager including a router for routing information to one of the first protocol stack and the second protocol stack;
   a user interface for communicating information and commands between the first protocol stack and a user and between the second protocol stack and the user for controlling the mobile telephone; and
   a bridge for providing communication of information between the first protocol stack and the second protocol stack, wherein control of the mobile telephone is provided via a single man machine interface that is substantially consistent across the first and second modes.

2. The system as claimed in claim 1, wherein the mode manager further comprises a man machine interface manager for translating information between the first air interface mode and the second air interface mode.

3. The system as claimed in claim 1, further comprising a common database for storage of user data utilized by the first and second protocol stacks, the user data including at least one of an address book entry, a phonebook entry, a short message, an email, a ringing tone, and a picture.

4. The system as claimed in claim 3, further comprising a call database for storing call related data by the first and second protocol stacks.

5. The system as claimed in claim 1, wherein the first air interface standard comprises the Global System for Mobile communication (GSM) air interface standard and the second air interface standard comprises the Telecommunications Industry Association/Electronics Industry Alliance Interim Standard 136 (TIA/EIA-136) air interface standard.

6. The system as claimed in claim 1, wherein the user interface, application layer, and mode manager are integrated with the first protocol stack.

7. A mobile telephone system, comprising:
a first protocol stack for supporting a first air interface standard providing a first functionality, the first protocol stack being supported by a first chipset of the mobile telephone;
a second protocol stack for supporting a second air interface standard providing a second functionality, to second protocol stack being supported concurrently with the first protocol stack by one of the first chipset and a second chipset of to mobile telephone;
a mode manager for managing switching of the system between a first mode utilizing the first air interface standard and a second mode utilizing the second air interface standard, the mode manager including a router for routing information to one of the first protocol stack and the second protocol stack;
a user interface for communicating information and commands between the first protocol stack and a user and between the second protocol stack and the user for controlling the mobile telephone; and
a bridge for providing communication of information between the first protocol stack and the second protocol stack,
wherein control of the first and second functionalities is provided via a single man machine interface that is substantially consistent across the first and second modes.

8. The system as claimed in claim 7, wherein the mode manager further comprises a man machine interface manager for translating information between the first air interface standard and the second air interface standard.

9. The system as claimed in claim 7, further comprising a database for storage of data by the first and second protocol stacks.

10. The system as claimed in claim 9, further comprising a call database for storing call related data by the first and second protocol stacks.

11. The system as claimed in claim 7, wherein the first air interface standard comprises the Global System for Mobile communication (GSM) air interface standard and the second air interface standard comprises the Telecommunications Industry Association/Electronics Industry Alliance Interim Standard 136 (TIA/EIA-136) air interface standard.

12. The system as claimed in claim 7, wherein the user interface, application layer, and mode manager are integrated with the first protocol stack.

13. A mobile telephone system, comprising:
means for managing switching of the system between a first mode utilizing a first air interface standard supported by a first protocol stack and a second mode utilizing a second air interface standard supported by a second protocol stack, the first protocol stack and the second protocol stack being supported concurrently by at least one chipset of the mobile telephone, the managing means further comprises means for routing information to one of the first protocol stank and the second protocol stack;
means for communicating information and commands between the first and second protocol stacks and a user for controlling the mobile telephone; and
bridge for providing communication of information between the first protocol stack and the second protocol stack,
wherein control of the mobile telephone is provided via a single man machine interface that is substantially consistent across the first and second modes.

14. The system as claimed in claim 13, wherein the managing means further comprises means for translating information between the first air interface standard and the second air interface standard.

15. The system as claimed in claim 13, further comprising means for storing user data utilized by the first and second protocol stacks, the user data including at least one of an address book entry, a phonebook entry, a short message, an email, a ringing tone, and a picture.

16. The system as claimed in claim 15, further comprising means for storing call related data by the first and second protocol stacks.

17. The system as claimed in claim 13, wherein the first air interface standard comprises the Global System for Mobile communication (GSM) air interface standard and the second air interface standard comprises the Telecommunications Industry Association/Electronics Industry Alliance Interim Standard 136 (TIA/EIA-136) air interface standard.

18. A mobile telephone, comprising:
a hardware system including at least one chipset and a hardware interface for controlling the mobile telephone;
a software system, including:
a mode manager for managing switching between a first mode utilizing a first air interface standard supported by a first protocol stack and a second mode utilizing a second air interface standard supported by a second protocol stack, the first and second protocol stacks running concurrently on the at least one chipset, the mode manager including a router for routing information to one of the first protocol stack and the second protocol stack;
a user interface for communicating information and commands between the first protocol stack and a user and between the second protocol stack and the user via the hardware interface; and
a bridge for providing communication of information between the first protocol stack and the second protocol stack, wherein the first protocol stack and the second protocol stack are run on separate chipsets, wherein the user interface provides control of the mobile telephone via a single man machine interface that is substantially consistent across the first and second modes.

19. The mobile telephone as claimed in claim 18, wherein the mode manager further comprises a man machine interface manager for translating information between the first air interface standard and the second air interface standard.

20. The mobile telephone as claimed in claim 18, further comprising a database for storage of data by the first and second protocol stacks.

21. The mobile telephone as claimed in claim 20, further comprising a call database for storing call related data by the first and second protocol stacks.

22. The mobile telephone as claimed in claim 18, wherein the first air interface standard comprises the Global System for Mobile communication (GSM) air interface standard and the second air interface standard comprises the Telecommunications Industry Association/Electronics Industry Alliance Interim Standard 136 (TIA/EIA-136) air interface standard.

23. The mobile telephone as claimed in claim 18, wherein the user interface, application layer, and mode manager are integrated with the first protocol stack.

* * * * *